United States Patent
Li et al.

(10) Patent No.: US 12,301,327 B2
(45) Date of Patent: May 13, 2025

(54) METHOD FOR BEAM SWITCHING AND UCI TRANSMISSION

(71) Applicant: ZTE Corporation, Guangdong (CN)

(72) Inventors: Xincai Li, Guangdong (CN); Li Tian, Guangdong (CN); Wei Zou, Guangdong (CN)

(73) Assignee: ZTE Corporation, Guangdong (CN)

( * ) Notice: Subject to any disclaimer, the term of this patent is extended or adjusted under 35 U.S.C. 154(b) by 414 days.

(21) Appl. No.: 17/810,125

(22) Filed: Jun. 30, 2022

(65) Prior Publication Data

US 2022/0337303 A1    Oct. 20, 2022

Related U.S. Application Data

(63) Continuation of application No. PCT/CN2020/106990, filed on Aug. 5, 2020.

(51) Int. Cl.
*H04B 7/06*    (2006.01)
*H04L 5/00*    (2006.01)
*H04W 56/00*    (2009.01)

(52) U.S. Cl.
CPC ......... *H04B 7/0695* (2013.01); *H04L 5/0051* (2013.01); *H04L 5/0053* (2013.01); *H04W 56/001* (2013.01)

(58) Field of Classification Search
CPC ... H04B 7/0695; H04B 7/0404; H04L 5/0051; H04L 5/0053; H04W 56/001; Y02D 30/70
USPC .................................................. 370/329–330
See application file for complete search history.

(56) References Cited

U.S. PATENT DOCUMENTS

| | | | |
|---|---|---|---|
| 2019/0081688 A1 | 3/2019 | Deenoo et al. | |
| 2019/0349061 A1* | 11/2019 | Cirik | H04L 1/0026 |
| 2019/0364445 A1* | 11/2019 | Kang | H04W 24/04 |
| 2021/0068162 A1* | 3/2021 | Agiwal | H04B 7/0617 |
| 2021/0136768 A1* | 5/2021 | Kang | H04L 1/00 |
| 2021/0352499 A1* | 11/2021 | Kim | H04W 24/04 |
| 2022/0329312 A1* | 10/2022 | Matsumura | H04W 76/19 |
| 2023/0138449 A1* | 5/2023 | Khoshnevisan | H04W 72/21 370/329 |
| 2023/0189373 A1* | 6/2023 | Matsumura | H04W 76/19 370/329 |

FOREIGN PATENT DOCUMENTS

| | | |
|---|---|---|
| CN | 1805297 | 7/2006 |
| CN | 107733484 | 2/2018 |

(Continued)

OTHER PUBLICATIONS

Co Pending EP Extended Search, EP Appl. No. 20947846.0, dated Oct. 19, 2022, 22 pages.

(Continued)

*Primary Examiner* — Candal Elpenord
(74) *Attorney, Agent, or Firm* — Perkins Coie LLP

(57) ABSTRACT

Disclosed are devices, systems and methods for beam switching and uplink control information transmission. In some implementations, a data communication method performing, by a mobile device, a first transmission on a first beam to a communication nod, and performing, by the mobile device, a second transmission subsequent to the first transmission, on a second beam different from the first beam that is selected by the mobile device.

19 Claims, 12 Drawing Sheets

(56) References Cited

FOREIGN PATENT DOCUMENTS

| | | |
|---|---|---|
| CN | 2018/171044 | 9/2018 |
| CN | 108632837 | 10/2018 |
| CN | 108702180 | 10/2018 |
| CN | 111372293 | 7/2020 |
| CN | 112136352 | 12/2020 |
| EP | 3681055 | 7/2020 |
| WO | 2019/110869 | 6/2019 |
| WO | 2019/226014 | 11/2019 |

OTHER PUBLICATIONS

International Search Report and Written Opinion for PCT/CN2020/106990, dated Apr. 25, 2021, 10 pages.
Samsung, "PHR triggering event for beam change" 3GPP TSG-RAN WG2 #99, R2-1709573, Berlin, Germany, Aug. 21-25, 2017, 3 pages.
Co Pending IN First Examination Report, IN Appl. No. 202247030695, dated Sep. 13, 2023, 6 pages.
Co Pending Chinese Office Action, CN Appl. No. 2020801043262, dated Mar. 12, 2024, 34 pages with unofficial English translation.

\* cited by examiner

600

Perform, by a mobile device, a first transmission on a first beam to a communication node — 610

Perform, by the mobile device, a second transmission subsequent to the first transmission, on a second beam different from the first beam that is selected by the mobile device — 620

Switch, by a first communication node, from a first beam to a second beam for a subsequent data transmission — 810

Receive, by the first communication node, a transmission from a second communication node — 820

Transmit, by the first communication node, to the second communication node, an acknowledgement message associated with the second beam — 830

Switch, by a mobile device, from a first beam to a second beam for a subsequent data transmission — 910

Transmit, by the mobile device, to a communication node, a preamble beam to indicate the switching of the beam — 920

Receive, by a communication node, a first transmission on a first beam from a mobile device — 1010

Receive, by the communication node, a second transmission subsequent to the first transmission, on a second beam different from the first beam that is selected by the mobile device — 1020

Update, by the communication node, a beam for a subsequent transmission from the mobile device to the second beam — 1020

FIG. 10

METHOD FOR BEAM SWITCHING AND UCI TRANSMISSION

CROSS-REFERENCE TO RELATED APPLICATION

This application is a continuation and claims priority to International Application No. PCT/CN2020/106990, filed on Aug. 5, 2020, the disclosure of which is hereby incorporated by reference herein in its entirety.

TECHNICAL FIELD

This patent document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, methods, apparatus, and systems for beam switching and uplink control information transmission.

In one aspect, a data communication method includes performing, by a mobile device, a first transmission on a first beam to a communication node, and performing, by the mobile device, a second transmission subsequent to the first transmission, on a second beam different from the first beam that is selected by the mobile device.

In another aspect, a data communication method includes switching, by a mobile device, from a first beam to a second beam for a subsequent data transmission to a communication node, and performing a notification that the second beam is used to carry the subsequent data transmission to a communication node.

In another aspect, a data communication method includes switching, by a first communication node, from a first beam to a second beam for a subsequent data transmission, receiving, by the first communication node, a transmission from a second communication node, and transmitting, by the first communication node, to the second communication node, an acknowledgement message associated with the second beam.

In another aspect, a data communication method includes switching, by a mobile device, from a first beam to a second beam for a subsequent data transmission, and transmitting, by the mobile device, to a communication node, a preamble beam to indicate the switching of the beam.

In another aspect, a data communication method receiving, by a communication node, a first transmission on a first beam from a mobile device, receiving, by the communication node, a second transmission subsequent to the first transmission, on a second beam different from the first beam that is selected by the mobile device, and updating, by the communication node, a beam for a subsequent transmission from the mobile device to the second beam.

BRIEF DESCRIPTION OF THE DRAWINGS

FIG. 6 shows an example of a data communication method based on some example embodiments of the disclosed technology.

FIG. 8 shows another example of a data communication method based on some example embodiments of the disclosed technology.

FIG. 9 shows another example of a data communication method based on some example embodiments of the disclosed technology.

FIG. 10 shows another example of a data communication method based on some example embodiments of the disclosed technology.

DETAILED DESCRIPTION

An uplink (UL) small data transmission for user equipment (UE) in a radio resource control (RRC) inactive state is being developed. There are two modes for UE in the RRC inactive state associated with the UL small data transmission. One is using a random access channel (RACH) procedure, e.g., using a scheduled physical uplink shared channel (PUSCH) transmission (Msg3) or a single message (MsgA) from the UE, and the other is a transmission of UL data on pre-configured PUSCH resources (e.g., reusing a configured grant type 1) when a timing advance (TA) is valid.

During the UL data transmission, a beam may be changed dynamically for the inactive UE (INACTIVE UE). In some implementations of the disclosed technology, UE may perform the operations for changing the beams and reporting to a base station (e.g., gNB) during the data transmission for the inactive UE.

The UL data transmission can be periodic and/or non-periodic for the UE in the RRC inactive state (RRC_inactive state UE). Active UE should report the measurement result of each downlink (DL) beam through channel status information (e.g. CSI part1), and the channel status information (e.g. CSI part1) can include at least one optimal beam or the top beams which have the best reference signal received power (RSRP). In addition, the base station (gNB) can choose one to tell the UE which beam will be used for DL data reception. Further, the beam information can be the CRI (CSI-RS resource index) or SSB-RI (SSB resource index).

For UL CG data transmission, a sounding reference signal (SRS) resource indicator of a transmitted beam (SRI) is configured in the RRC message, and once it configured, a configured grant (CG) data transmission will use this beam and it cannot change dynamically.

Figure 1:
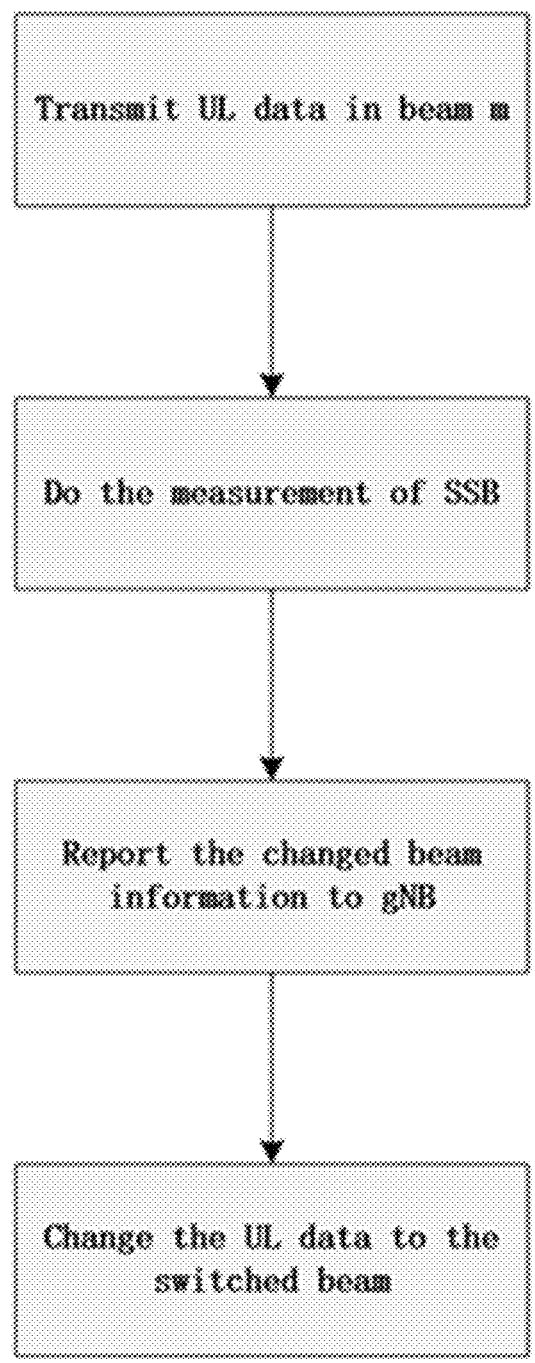
FIG. 1 illustrates an example method to perform an uplink beam management by user equipment (UE) during an inactive state for data transmission to achieve a dynamic beam switching.

FIG. 1 illustrates an example method to perform an uplink beam management by user equipment (UE) during an inactive state for data transmission to achieve a dynamic beam switching.

In some implementations, UE can perform the measurement of SSB (Synchronization Signal/PBCH block) and/or channel state information reference signal (CSI-RS), and if the RSRP of one of the other beams of the SSB is higher than the existing beam that is being used by the UL data transmission, then UE can change the beam for the data transmission to that beam. Alternatively, if the UE measurement RSRP of the SSB beam that is the same as the UL data transmission lower than a predetermined threshold value for a long time, then UE can change the beam of UL data transmission to a new beam. Therefore, UE can use the DL/UL channel reciprocity to determine the UL transmission beam.

In some implementations, UE reports the beam change information to the base station (e.g., gNB) for the UL data transmission. Exactly, UE can report at least one of a channel state information resource signal resource index (CRI) or a synchronization signal/PBCH (physical broadcast channel) block resource index (SSBRI), which is information on the data transmission beam if the UE changes the beam of the UL data transmission. In addition, after the base station (e.g., gNB) receives the report and the information, the base station (e.g., gNB) can change the reception beam to the reported one for a UL data reception.

Figure 2:
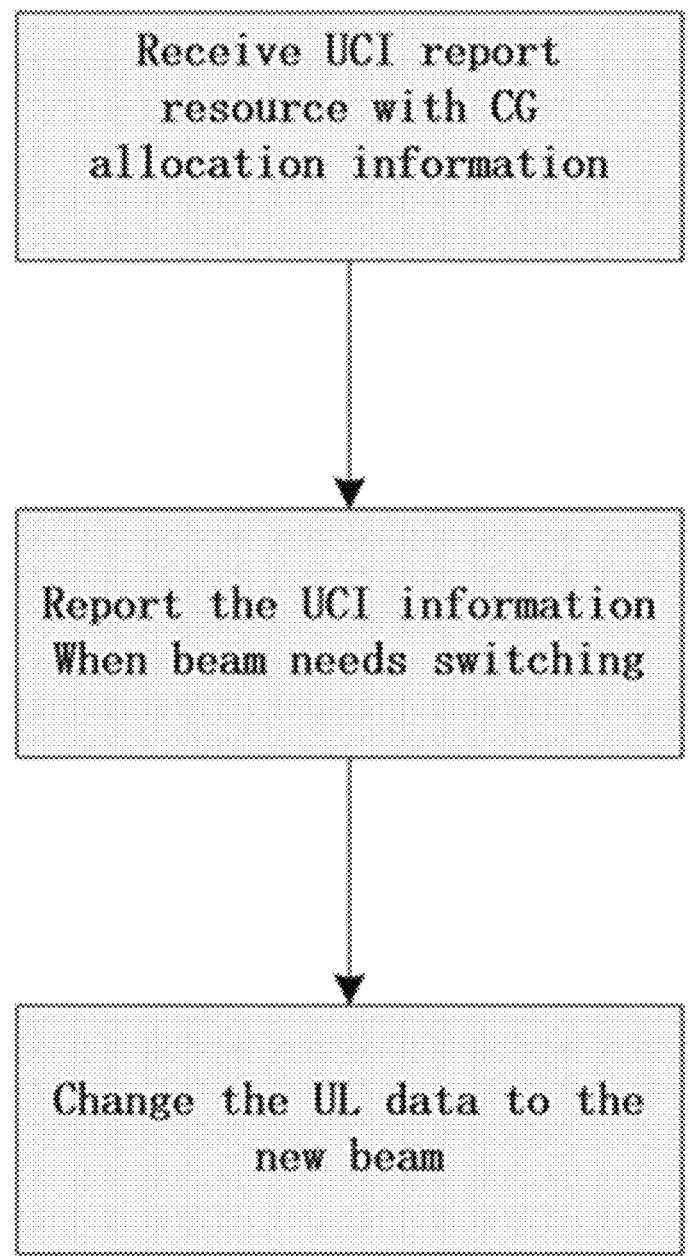
FIG. 2 illustrates an example method for acquiring a report resource for an uplink beam switching.

FIG. 2 illustrates an example method for acquiring a report resource for an uplink beam switching.

In some implementations, UL beam switching information can be considered as one kind of CSI reporting or uplink control information (UCI). The CSI reporting include the changed beam information for UL data transmission. The beam information can be a CRI or an SSBRI or an SRI. In addition, UE can receive one RRC message for CSI reporting when configuring a CG data transmission.

For example, in the CG resource configuration RRC message (ConfiguredGrantConfig), a new element PUCCH resource ID is added for UE to determine the resource to report the CSI transmitted on the PUCCH, such as PUCCH resource ID=3, then if UE changes the beam and there is no PUSCH transmission, then UE can report the CSI including the transmission beam to the base station (e.g., gNB) through this PUCCH resource. In addition, after receiving this information in PUCCH resource #3, the base station (e.g., gNB) can change the receive beam to the reported one for UL data, as illustrated in FIG. 2.

Figure 3:
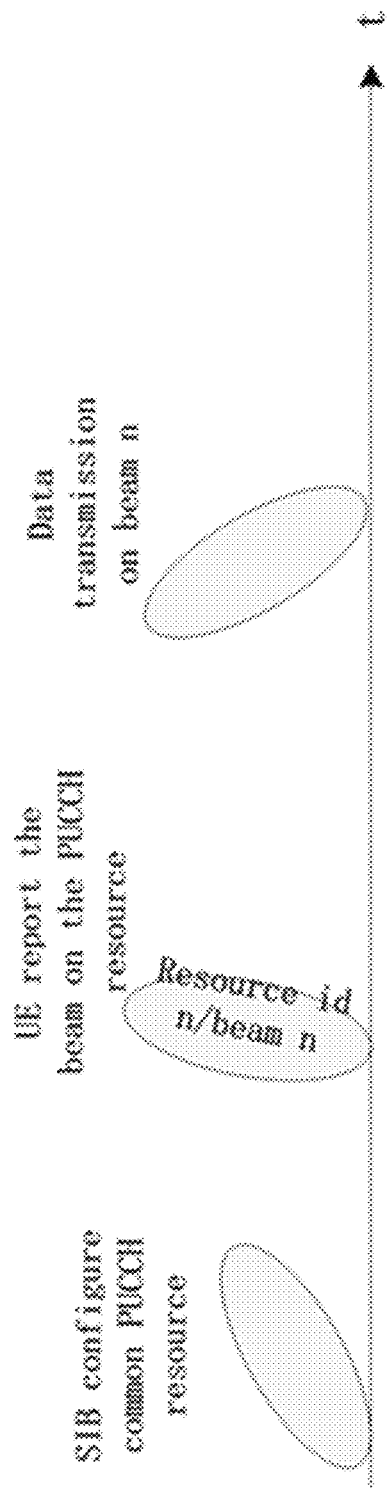
FIG. 3 illustrates another example method for acquiring the report PUCCH resource for beam switching by UE.

FIG. 3 illustrates another example method for acquiring the report PUCCH resource for beam switching by UE.

For an inactive UE, as certain UE-specific information may not be received for power saving consideration, and only the common information can be detected. In this case, the base station (e.g., gNB) can allocate the common PUCCH resource for the beam report through SIB message for the inactive UE.

In addition, each UE can report the SSB resource index or CSI-RS resource indicator (CSI-RS RI) or SRS resource indicator (SRS RI) for the new UL data transmission beam it changed to for the next data transmission. In some implementations, the information is scrambled by the cell radio network temporary identifier (C-RNTI) of each UE. In some implementations, the scrambled information is carried on the PUCCH transmitted on the common PUCCH resource.

Furthermore, a plurality of UEs can be grouped into M groups and each group can be allocated one PUCCH resource. In some implementations, the UEs in the same group can report the beam information in turn. In this case, the PUCCH resource may not collide for a different UE. The reporting sequence between different UEs can be defined when grouping.

Through the C-RNTI, the base station (e.g., gNB) can know which UE reports the changed beam information and it will receive the UL data in this beam for that UE. For example, as illustrated in FIG. 3, UE first receives the SIB message that contains the PUCCH resources for RRC_inactive state UE for reporting the switched beam, then UE can use this PUCCH resource to report a beam n or resource id n and associated information to the base station (e.g., gNB), then it can change the UL data transmission beam to beam n in a later time.

Figure 4:
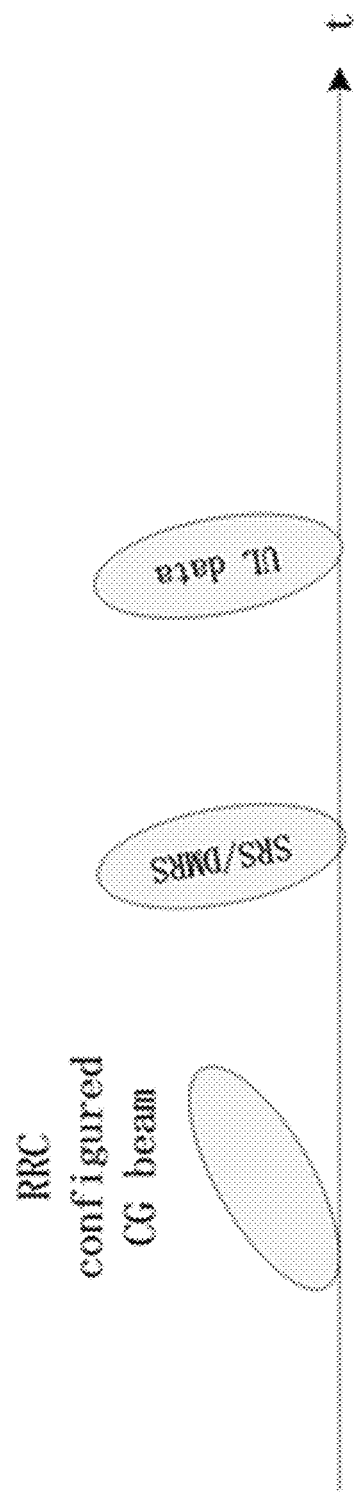
FIG. 4 illustrates an example method for notifying a base station (e.g., gNB) of a beam change for a subsequent data transmission.

FIG. 4 illustrates an example method for notifying a base station (e.g., gNB) of a beam change for a subsequent data transmission.

The beam for a data transmission can be related to one sequence, such as DMRS sequence or SRS sequence or sequence resource. In addition, one sequence resource may be mapped to a corresponding beam. If UE determines to change the beam, it will send a sequence on that resource. If the base station (e.g., gNB) detects the sequence on that resource, it will become aware of the data transmission beam information.

For example, as illustrated in FIG. 4, if UE wants to change the beam to beam "5" for example, it can transmit one SRS or a demodulation reference signal (DMRS) on the SRS/DMRS resource corresponding to beam "5," such as a beam on port 5. After transmitting the sequence, UE can change the UL beam to a new beam corresponding to the port 5. For the base station (e.g., gNB), it will perform a blind detection on the predefined port and resource, and if it successfully detects the sequence, it will become aware of the beam for use by the UE for UL data transmission.

Figure 5:
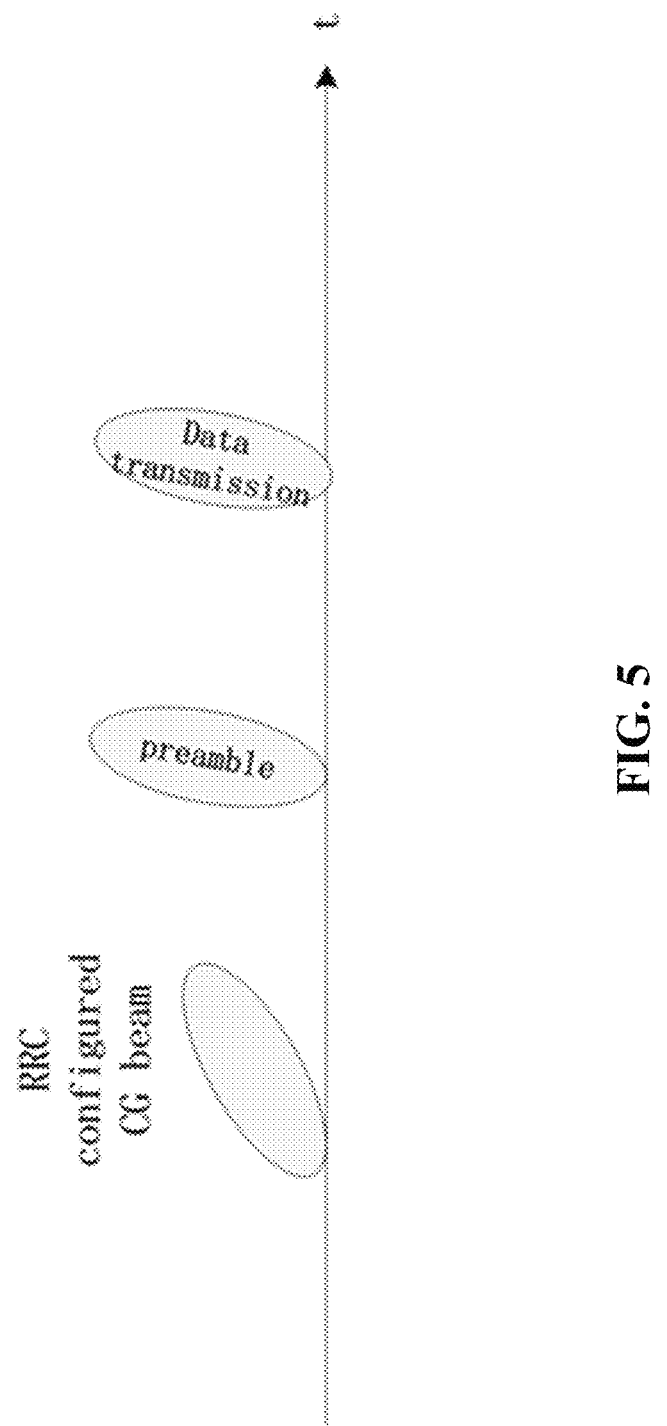
FIG. 5 illustrates an example method for controlling the beam or UCI report resource by the base station (e.g., gNB) for UL data transmission.

FIG. 5 illustrates an example method for controlling the beam or UCI report resource by the base station (e.g., gNB) for UL data transmission.

After UE transmits the UL data, the base station (e.g., gNB) can transmit ACK/NACK information as a feedback for this data transmission. The ACK/NACK information can be carried on the DCI. In this DCI, the base station (e.g., gNB) can notify UE of the changed UL data beam information, such as the SRI=5, then after receiving this information, UE will change the data transmission beam on this SRI.

In another implementation, the DCI includes PRI (PUCCH resource indication) to notify UE of the PUCCH resource for reporting beam changes.

In some implementations, the method illustrated in FIG. 5 can also be used to other CSI reporting or UCI reporting for an inactive UE (INACTIVE UE).

UE can determine the beam for UL data transmission based on the latest preamble beam. If the preamble changes the beam, then the data will be transmitted through the beam corresponding to the preamble, as illustrated in FIG. 5.

As the preamble can be configured to be mapped to the SSB beam, therefore, if UE transmits a certain preamble on the occasion, the base station (e.g., gNB) will identify which transmission beam is to be used for the UL transmission. If UE wants to change the UL data beam, it can first transmit a certain preamble on the corresponding occasion, and then it will change the UL beam to another beam corresponding to the preamble. In this way, the base station (e.g., gNB) will identify a newly switched beam that will be used for a subsequent UL data transmission.

In some implementations, UE decides to switch the beam and reports a target beam (a beam targeted or intended to be used in a subsequent transmission) directly to the base station (e.g., gNB), and the UE may switch to the target beam for UL data transmission after the report.

When the base station (e.g., gNB) receives the report, it may adjust its receiving beam to the target beam, and may start to use the target beam for a subsequent UL data reception.

In some implementations of the disclosed technology, UE may report the target beam in UCI. Furthermore, UCI may be contained in PUSCH.

In some implementations of the disclosed technology, a report may be transmitted by using a UCI resource broadcast by SIB, and the CSI reporting information may be scrambled by the C-RNTI.

In some implementations of the disclosed technology, a beam report may be contained in PUCCH, where PUCCH resources may be configured in advance (e.g., when CG is configured), or may be configured when the base station (e.g., gNB) transmits a feedback ACK/NACK for a small data.

In some implementations of the disclosed technology, UE may report the target beam by an indirect indication, e.g., different DMRS/SRS sequences, so that the base station can identify the changes in the transmission beam based on the indirect indication.

In some implementations of the disclosed technology, the beam for UL data transmission may be identified based on the latest preamble.

FIG. 6 shows an example of a data communication method based on some example embodiments of the disclosed technology.

In some embodiments of the disclosed technology, a data communication method 600 includes, at 610, receiving, by a mobile device, a first transmission on a first beam to a communication node, and at 620, performing, by the mobile device, a second transmission subsequent to the first transmission, on a second beam different from the first beam that is selected by the mobile device.

Figure 7:
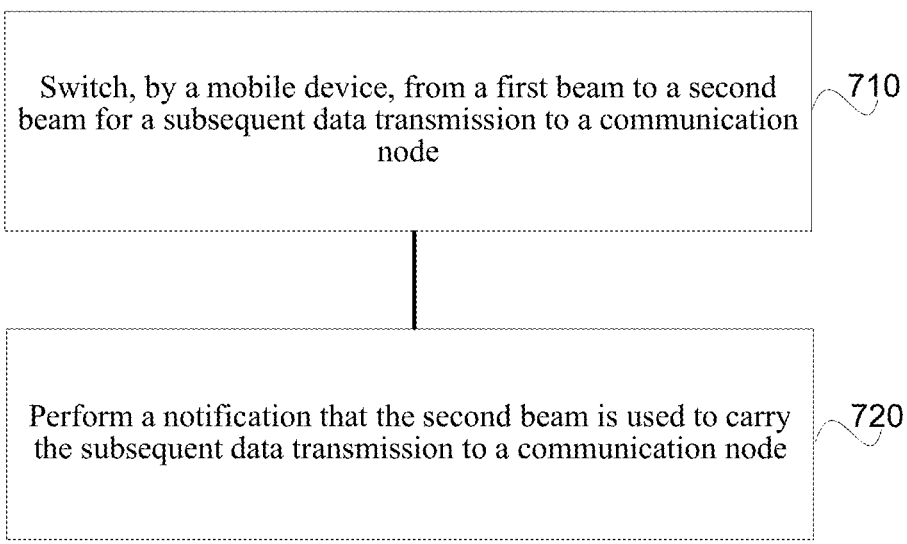
FIG. 7 shows another example of a data communication method based on some example embodiments of the disclosed technology.

FIG. 7 shows an example of a data communication method based on some example embodiments of the disclosed technology.

In some embodiments of the disclosed technology, a data communication method 700 includes, at 710, switching, by a mobile device, from a first beam to a second beam for a subsequent data transmission to a communication node, and at 720, performing a notification that the second beam is used to carry the subsequent data transmission to a communication node.

FIG. 8 shows an example of a data communication method based on some example embodiments of the disclosed technology.

In some embodiments of the disclosed technology, a data communication method 800 includes, at 810, switching, by a first communication node, from a first beam to a second beam for a subsequent data transmission, at 820, receiving, by the first communication node, a transmission from a second communication node, and at 830, transmitting, by the first communication node, to the second communication node, an acknowledgement message associated with the second beam.

FIG. 9 shows an example of a data communication method based on some example embodiments of the disclosed technology.

In some embodiments of the disclosed technology, a data communication method 900 includes, at 910, switching, by a mobile device, from a first beam to a second beam for a subsequent data transmission, and at 920, transmitting, by the mobile device, to a communication node, a preamble beam to indicate the switching of the beam.

FIG. 10 shows an example of a data communication method based on some example embodiments of the disclosed technology.

In some embodiments of the disclosed technology, a data communication method 1000 includes, at 1010, receiving, by a communication node, a first transmission on a first beam from a mobile device, at 1020, receiving, by the communication node, a second transmission subsequent to the first transmission, on a second beam different from the first beam that is selected by the mobile device, and at 1030, updating, by the communication node, a beam for a subsequent transmission from the mobile device to the second beam.

Figure 11:
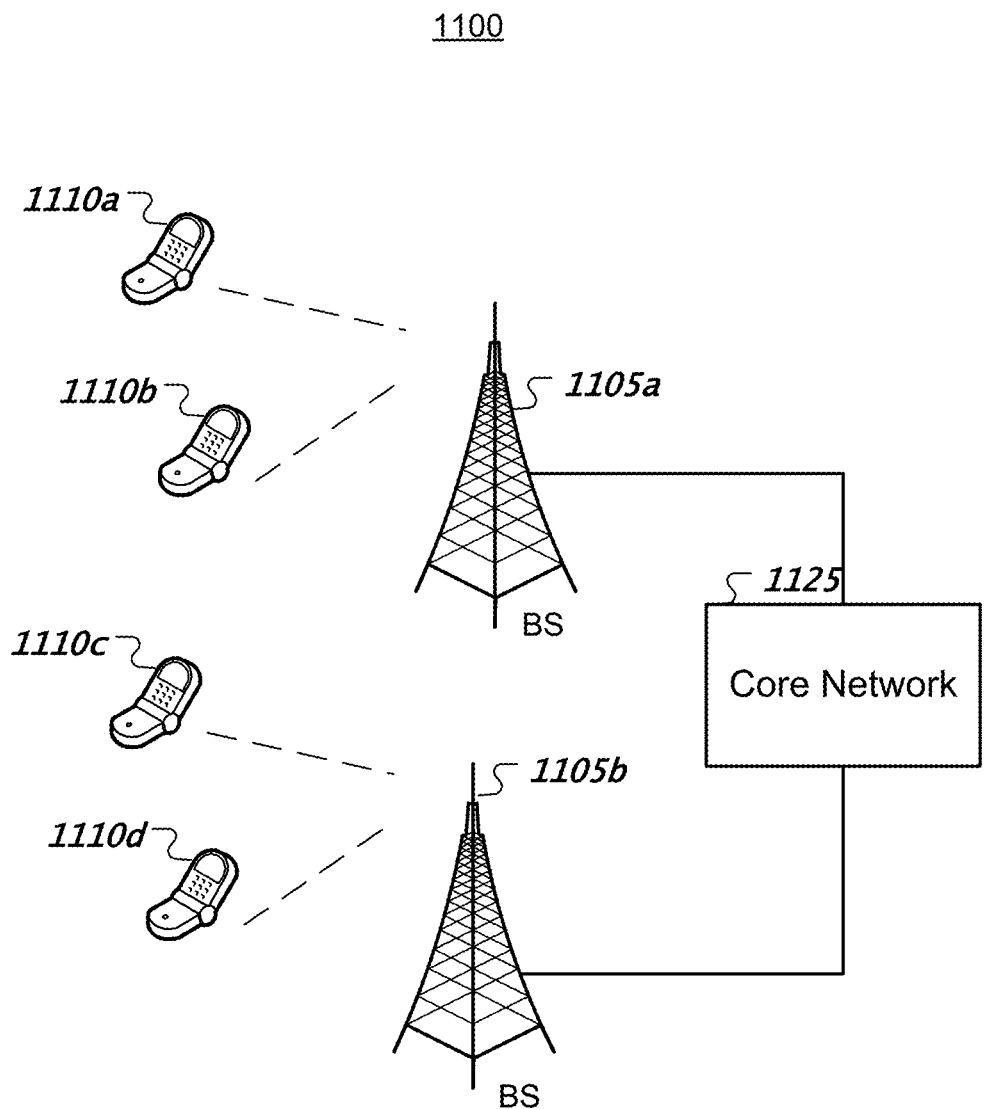
FIG. 11 shows an example of a wireless communication system where techniques in accordance with one or more embodiments of the present technology can be applied.

FIG. 11 shows an example of a wireless communication system 1100 where techniques in accordance with one or more embodiments of the present technology can be applied. A wireless communication system 1100 can include one or more base stations (BSs) 1105a, 1105b, one or more wireless devices 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies. The techniques and embodiments described in the present document may be implemented by the base stations of wireless devices described in the present document.

Figure 12:
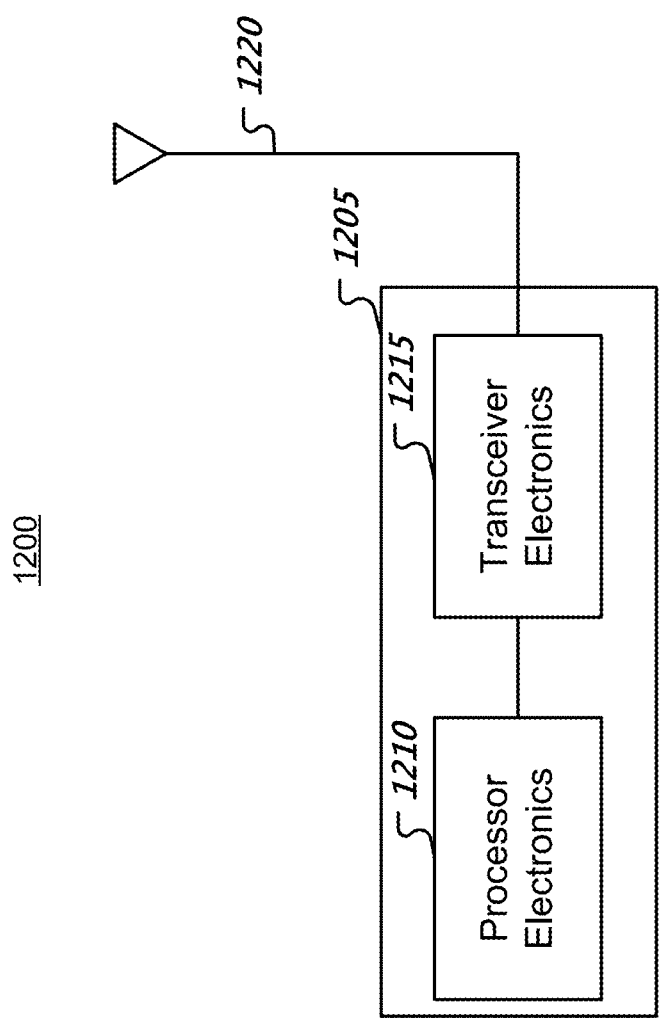
FIG. 12 is a block diagram representation of a portion of a radio station in accordance with one or more embodiments of the present technology can be applied.

FIG. 12 is a block diagram representation of a portion of a radio station in accordance with one or more embodiments of the present technology can be applied. A radio 1205 such as a base station or a wireless device (or UE) can include processor electronics 1210 such as a microprocessor that implements one or more of the wireless techniques presented in this document. The radio 1205 can include transceiver electronics 1215 to send and/or receive wireless signals over one or more communication interfaces such as antenna 1220. The radio 1205 can include other communication interfaces for transmitting and receiving data. Radio 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio 1205. In some embodiments, the radio 1205 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: receiving, by a mobile device, Clause 2. The method of clause 1, further comprising performing, by the mobile device, a measurement associated with the first beam after transmitting data over the first beam to the communication node.

Clause 3. The method of clause 2, wherein the second transmission is performed by switching, by the mobile device, from the first beam to the second beam for the second transmission, upon determination that the measurement fails to meet a predetermined threshold.

Clause 4. The method of clause 3, wherein the measurement is associated with a reference signal received power of synchronization signal block (e.g., RSRP of SSB).

Clause 5. The method of clause 4, wherein the reference signal received power of synchronization signal block of the second beam is higher than the reference signal received power of synchronization signal block of the first beam.

Clause 6. The method of clause 3, further comprising transmitting, to the communication node, a report including information associated with the second beam.

Clause 7. The method of clause 6, wherein the information associated with the second beam includes at least one of channel state information resource signal resource index (e.g., CRI) or synchronization signal block resource index (e.g., SSBRI).

Clause 8. The method of clause 1, wherein the mobile device includes a first mobile device, and wherein the method further comprises: receiving, by the first mobile device, a report resource indicating a status of a first channel being used by the first mobile device; determining, by the first mobile device, whether to switch from the first channel to a second channel; and performing, upon a determination by the first mobile device to switch from the first channel to the second channel, a subsequent transmission over the second channel.

Clause 9. The method of clause 8, wherein the report resource includes at least a resource for channel status information (e.g., CSI) or uplink control information (UCI).

Clause 10. The method of clause 9, wherein the channel status information includes at least one of channel state information resource signal resource index (CRI), synchronization signal block resource index (SSBRI), or sounding reference signal resource indicator (SRI).

Clause 11. The method of clause 9, wherein the report resource is associated with a configured grant.

Clause 12. The method of clause 8, wherein the report resource includes a radio resource control message upon a configuration of configured grant data transmission.

Clause 13. The method of clause 8, further comprising, upon a determination by the first mobile device to switch from the first channel to the second channel, transmitting, by the first mobile device, to the communication node, a report indicating the channel status of the second channel.

Clause 14. The method of clause 13, wherein the report is transmitted through a physical uplink control channel resource.

Clause 15. The method of clause 8, wherein the report resource includes a common physical uplink control channel resource configured to be provided to a plurality of mobile devices including the first mobile device.

Clause 16. The method of clause 15, wherein the first mobile device includes an inactive mobile device, and wherein the report resource includes a common physical uplink control channel resource transmitted to the inactive mobile device through a system information block message.

Clause 17. The method of clause 15, wherein the first mobile device belongs to a mobile device group, and wherein the common physical uplink control channel resource is configured to be transmitted to the mobile device group.

Clause 18. The method of clause 15, wherein the common physical uplink control channel carrying channel status information that is scrambled using a cell radio network temporary identifier (C-RNTI) configured to distinguish the first mobile device from other mobile devices.

Clause 19. A data communication method, comprising: switching, by a mobile device, from a first beam to a second beam for a subsequent data transmission to a communication node; and performing a notification that the second beam is used to carry the subsequent data transmission to a communication node.

Clause 20. The method of clause 19, wherein the notification includes a predetermined signal sequence corresponding to the second beam.

Clause 21. The method of clause 20, wherein the predetermined signal sequence corresponding to the second beam includes at least one of a demodulation reference signal (DMRS) sequence, a sounding reference signal (SRS) sequence.

Clause 22. A data communication method, comprising: switching, by a first communication node, from a first beam to a second beam for a subsequent data transmission; receiving, by the first communication node, a transmission from a second communication node; and transmitting, by the first communication node, to the second communication node, an acknowledgement message associated with the second beam.

Clause 23. The method of clause 22, wherein the acknowledgement message is transmitted through a transmission of downlink control information.

Clause 24. The method of clause 22, wherein the acknowledgement message includes physical uplink control channel resource indication for uplink control information.

Clause 25. The method of clause 22, wherein the first communication node includes a base station, and the second communication node includes user equipment.

Clause 26. A data communication method, comprising: switching, by a mobile device, from a first beam to a second beam for a subsequent data transmission; and transmitting, by the mobile device, to a communication node, a preamble beam to indicate the switching of the beam.

Clause 27. The method of clause 26, wherein the preamble beam is mapped to a resource that related to a synchronization signal block corresponding to the second beam.

Clause 28. A data communication method, comprising: receiving, by a communication node, a first transmission on a first beam from a mobile device; receiving, by the communication node, a second transmission subsequent to the first transmission, on a second beam different from the first beam that is selected by the mobile device; and updating, by the communication node, a beam for a subsequent transmission from the mobile device to the second beam.

Clause 29. The method of clause 28, further comprising receiving, by the communication node, from the mobile device, a report including information associated with the second beam.

Clause 30. The method of clause 29, wherein the information associated with the second beam includes at least one of channel state information resource signal resource index or synchronization signal block resource index.

Clause 31. The method of clause 28, further comprising receiving, by the communication node, from the mobile device, a report indicating the channel status of the second channel.

Clause 32. The method of clause 31, wherein the report is transmitted through a physical uplink control channel resource.

Clause 33. The method of clause 28, further comprising receiving a notification that the second beam is used to carry a subsequent data transmission from the mobile device.

Clause 34. The method of clause 33, wherein the notification includes a predetermined signal sequence corresponding to the second beam.

Clause 35. The method of clause 34, wherein the predetermined signal sequence corresponding to the second beam includes at least one of a demodulation reference signal (DMRS) sequence, a sounding reference signal (SRS) sequence.

Clause 36. The method of clause 28, further comprising transmitting, by the communication node, to the mobile device, an acknowledgement message associated with the second beam.

Clause 37. The method of clause 36, wherein the acknowledgement message is transmitted through a transmission of downlink control information.

Clause 38. The method of clause 36, wherein the acknowledgement message includes physical uplink control channel resource indication for uplink control information.

Clause 39. An apparatus for wireless communication, comprising a memory and a processor, wherein the processor reads code from the memory and implements a method recited in any of clauses 1 to 38.

Clause 40. A computer readable program storage medium having code stored thereon, the code, when executed by a processor, causing the processor to implement a method recited in any of clauses 1 to 38.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A data communication method, comprising:
performing, by a mobile device, a first transmission on a first beam to a communication node; and
performing, by the mobile device, a measurement associated with the first beam after performing the first transmission on the first beam to the communication node,
wherein the mobile device includes a first mobile device, and wherein the method further comprises:
receiving, by the first mobile device, a report resource for indicating a status of a first channel being used by the first mobile device;
determining, by the first mobile device, whether to switch from the first channel to a second channel; and
performing, upon a determination by the first mobile device to switch from the first channel to the second channel, a subsequent transmission over the second channel,
wherein the report resource includes a common physical uplink control channel resource configured to be provided to a plurality of mobile devices including the first mobile device, wherein the first mobile device includes an inactive mobile device, and wherein the common physical uplink control channel resource is transmitted to the inactive mobile device through a system information block message.

2. The method of claim 1, wherein the measurement is associated with a reference signal received power of synchronization signal block, wherein the reference signal received power of synchronization signal block of the second beam is higher than the reference signal received power of synchronization signal block of the first beam.

3. The method of claim 1, further comprising transmitting, to the communication node, a report including information associated with the second beam, wherein the information associated with the second beam includes at least one of: channel state information resource signal resource index or synchronization signal block resource index.

4. The method of claim 1, wherein the report resource includes at least one of: a resource for channel status information or uplink control information; or a radio resource control message upon a configuration of configured grant data transmission.

5. The method of claim 1, further comprising, upon a determination by the first mobile device to switch from the first channel to the second channel, transmitting, by the first mobile device, to the communication node, a report indicating a channel status of the second channel.

6. The method of claim 1, further comprising:
performing a notification that the second beam is used to carry the subsequent data transmission to a communication node.

7. The method of claim 6, wherein the notification includes a predetermined signal sequence corresponding to the second beam.

8. The method of claim 1, further comprising:
transmitting, by the mobile device, to a communication node, a preamble beam to indicate the switching of the beam.

9. The method of claim 8, wherein the preamble beam is mapped to a resource that related to a synchronization signal block corresponding to the second beam.

10. A data communication method, comprising:
switching, by a first communication node, from a first beam to a second beam for a subsequent data transmission;
receiving, by the first communication node, a transmission from a second communication node; and
transmitting, by the first communication node, to the second communication node, an acknowledgement message associated with the second beam,
wherein the second communication node includes a first mobile device, and wherein the method comprises:
providing, by the first communication node, to the first mobile device, a report resource for the first mobile device to indicate a status of a first channel being used by the first mobile device,
wherein the report resource includes a common physical uplink control channel resource configured to be provided to a plurality of mobile devices including the first mobile device, wherein the first mobile device includes an inactive mobile device, and wherein the common physical uplink control channel resource is transmitted to the inactive mobile device through a system information block message.

11. The method of claim 10, wherein the acknowledgement message is transmitted through a transmission of downlink control information.

12. The method of claim 10, wherein the acknowledgement message includes physical uplink control channel resource indication for uplink control information.

13. The method of claim 10, wherein the first communication node includes a base station, and the second communication node includes user equipment.

14. A data communication method, comprising:
receiving, by a communication node, a first transmission on a first beam from a mobile device; and
receiving, by the communication node, a second transmission subsequent to the first transmission, on a second beam different from the first beam that is selected by the mobile device,
wherein the mobile device includes a first mobile device, and wherein the method comprises:

providing, by the communication node, to the first mobile device, a report resource for the first mobile device to indicate a status of a first channel being used by the first mobile device, wherein the report resource includes a common physical uplink control channel resource configured to be provided to a plurality of mobile devices including the first mobile device, wherein the first mobile device includes an inactive mobile device, and wherein the common physical uplink control channel resource is transmitted to the inactive mobile device through a system information block message.

15. The method of claim 14, further comprising receiving, by the communication node, from the mobile device, a report including information associated with the second beam, wherein the information associated with the second beam includes at least one of channel state information resource signal resource index or synchronization signal block resource index.

16. The method of claim 14, further comprising receiving, by the communication node, from the mobile device, a report indicating a channel status of a channel.

17. The method of claim 14, further comprising receiving a notification that the second beam is used to carry a subsequent data transmission from the mobile device.

18. The method of claim 17, wherein the notification includes a predetermined signal sequence corresponding to the second beam.

19. The method of claim 14, further comprising transmitting, by the communication node, to the mobile device, an acknowledgement message associated with the second beam.

* * * * *